(12) United States Patent
Cheok et al.

(10) Patent No.: US 7,907,617 B2
(45) Date of Patent: Mar. 15, 2011

(54) METHOD AND SYSTEM FOR PROGRAMMABLE BANDWIDTH ALLOCATION

(75) Inventors: Yook Khai Cheok, Palo Alto, CA (US);
Jillian Yue Yang, San Jose, CA (US);
Yih Chuan Chen, Sunnyvale, CA (US);
Michael Lau, Miami Beach, FL (US)

(73) Assignee: Broadcom Corporation, Irvine, CA (US)

( * ) Notice: Subject to any disclaimer, the term of this patent is extended or adjusted under 35 U.S.C. 154(b) by 341 days.

(21) Appl. No.: 11/960,982

(22) Filed: Dec. 20, 2007

(65) Prior Publication Data
US 2009/0161693 A1 Jun. 25, 2009

(51) Int. Cl.
*H04L 12/28* (2006.01)
(52) U.S. Cl. ........................................ 370/395.4
(58) Field of Classification Search .................. None
See application file for complete search history.

(56) References Cited

U.S. PATENT DOCUMENTS

| | | | | |
|---|---|---|---|---|
| 5,867,480 A * | 2/1999 | Thomas et al. | | 370/230 |
| 6,052,368 A * | 4/2000 | Aybay | | 370/357 |
| 6,145,010 A * | 11/2000 | Hiscock et al. | | 709/238 |
| 6,580,700 B1 * | 6/2003 | Pinard et al. | | 370/332 |
| 7,054,968 B2 * | 5/2006 | Shrader et al. | | 710/105 |
| 7,417,637 B1 * | 8/2008 | Donham et al. | | 345/506 |
| 2005/0141514 A1 * | 6/2005 | Kogut | | 370/395.4 |
| 2008/0040724 A1 * | 2/2008 | Kang et al. | | 718/104 |

* cited by examiner

*Primary Examiner* — Robert W Wilson
(74) *Attorney, Agent, or Firm* — McAndrews, Held & Malloy, Ltd.

(57) ABSTRACT

The disclosed systems and methods relate to allocating bandwidth to a plurality of ports that access a shared resource. An exemplary system may comprise a multiplexer, a table, and a scheduling circuit. The table may define when a port has access to the shared resource. The table entries may be based on the number of ports with access to the shared resource and the required bandwidth in each of the ports. The scheduling circuit controls the multiplexer according to the table, and the ports may gain access to the shared resource one port at a time.

28 Claims, 4 Drawing Sheets

METHOD AND SYSTEM FOR PROGRAMMABLE BANDWIDTH ALLOCATION

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Network switching devices may support several ports— each port may have a pre-defined bandwidth requirement. Traffic may be channeled across a single data bus (such as an Ipipe) to be processed by downstream components. Time Division Multiplexing (TDM) may be used to arbitrate port access to the Ipipe. Each port accumulates data as it arrives. To guarantee line rate data transfer for a port, the TDM arbiter should service each port at the correct frequency. When a network switching device is manufactured, this service frequency may be determined according to the bandwidth associated with each port.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for bandwidth allocation using programmable TDM arbitration as shown in and/or described in connection with at least one of the figures, as set forth more completely in the claims. Advantages, aspects and novel features of the present invention, as well as details of an illustrated embodiment thereof, will be more fully understood from the following description and drawings.

DETAILED DESCRIPTION OF THE INVENTION

Aspects of the present invention relate to employing programmable scheduling logic to achieve greater configurability in network switching devices that may be designed on integrated circuits. By optimizing aggregate bandwidth while supporting multiple switch configurations, aspects of the present invention may shorten time-to-market and reduce development costs for consumer products. Aspects of the present invention use a programmable Time Division Multiplexer (TDM) to arbitrate port access to downstream components. Aspects of the present invention may also support multiple products by using a programmable table-driven architecture.

Figure 1:
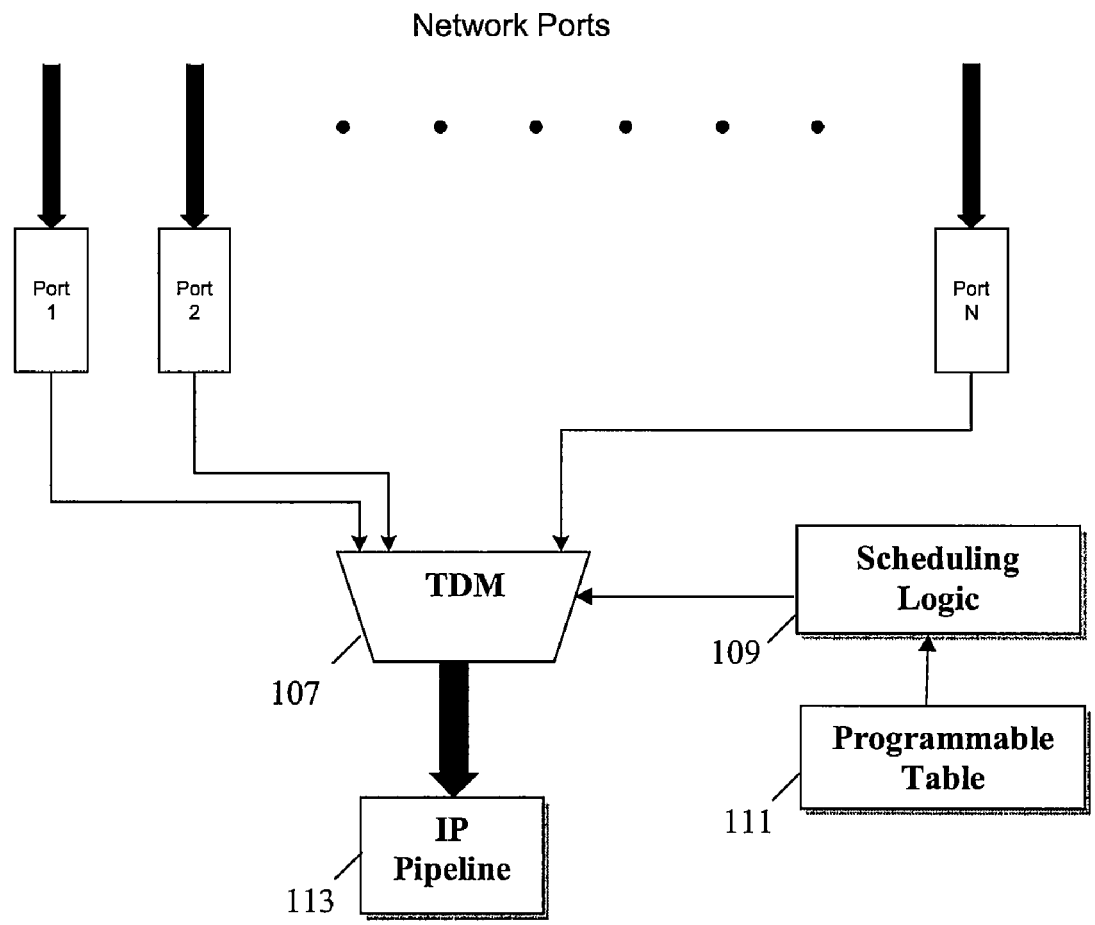
FIG. 1 is a block diagram that illustrates a first exemplary system for TDM arbitration in accordance with a representative embodiment of the present invention.

FIG. 1 illustrates TDM arbitration in accordance with a representative embodiment of the present invention. Port traffic is channeled through a Time Division Multiplexer (TDM), 107, that may arbitrate access to downstream components. N network ports (port 1, port 2, . . . port N) may vie for access to the IP pipeline, 113. The TDM, 107, is driven by TDM scheduling logic, 109, in order to arbitrate port access to a common resource, e.g. the IP pipeline, 113.

The TDM scheduling logic, 109, may use a programmable table, 111, to select port access. The programmable table, 111, is used to describe the number of ports and their service requirements. The scheduling logic, 109, may be designed to possess knowledge of the table format without requiring specific table content a priori.

The network switching device may be designed to support a maximum aggregate bandwidth (BW) across 1 to N ports using TDM arbitration. The bus width and FIFO buffer depth may be determined at design time and optimized for a large range of ports with varying line speeds.

A programmable table, 111, may be used which contains M entries, where M>=N. The user configures how many of the M entries are to be used in the arbitration process (1 to M). Each entry of the table may represent an amount of bandwidth equal to bandwidth divided by the number of entries used. The table entries may be programmed by assigning each entry to a port. Multiple entries may be assigned to the same port. The sum of the entries being assigned to a particular port may represent a bandwidth greater than or equal to the bandwidth required to satisfy the line rate required on that port. The entries of the table that are used may define the order in which the ports are serviced and granted access to the IPipe processing pipeline, 113.

Figure 2:
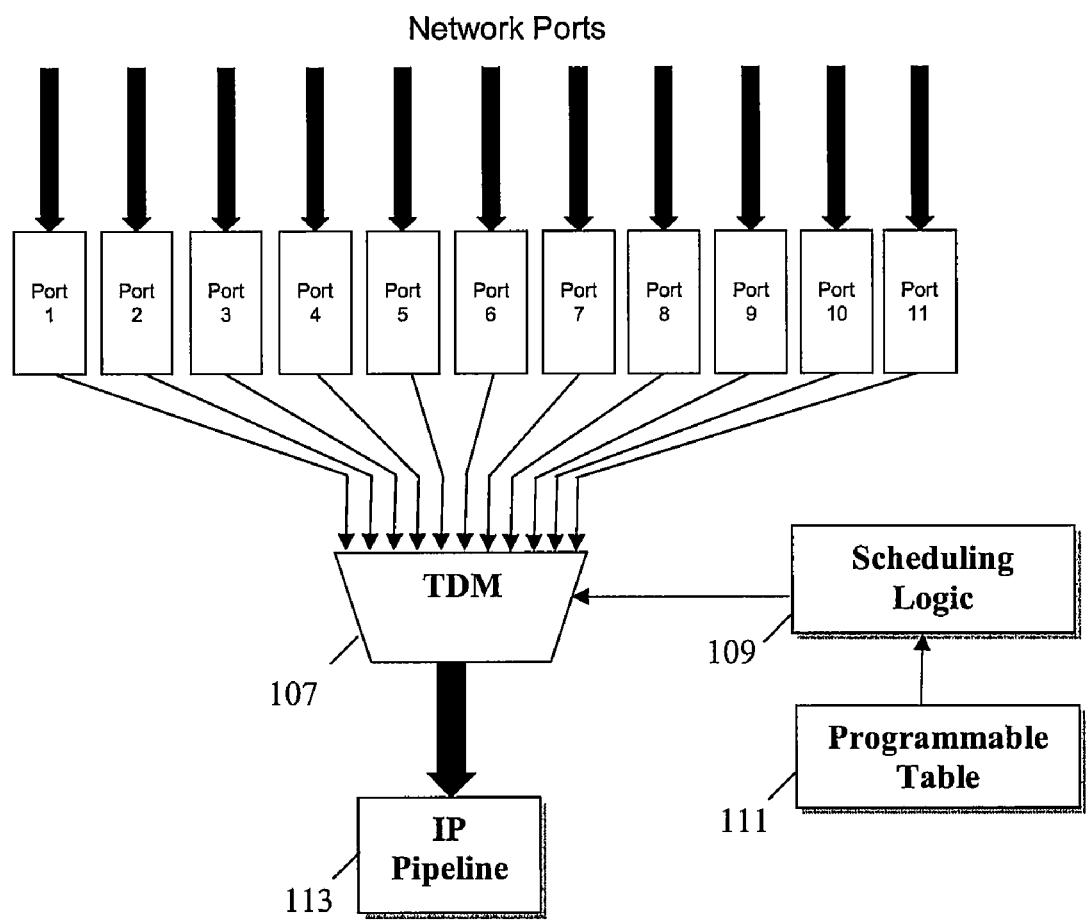
FIG. 2 is a block diagram that illustrates a second exemplary system for TDM arbitration in accordance with a representative embodiment of the present invention.

FIG. 2 illustrates TDM arbitration example with 10 1G ports (ports 1-10) and 1 10G port (port 11). Port traffic is channeled through a Time Division Multiplexer (TDM), 107, that may arbitrate access to downstream components. Eleven network ports (port 1, port 2, . . . port 11) may vie for access to the IP pipeline, 113. The TDM, 107, is driven by TDM scheduling logic, 109, in order to arbitrate port access to a common resource, e.g. the IP pipeline, 113.

The TDM scheduling logic, 109, may use a programmable table, 111, to select port access. An exemplary table for this configuration is shown below as Table 1. Table 1 contains 20 entries (e.g. 0 to 19). The odd entries are assigned to port 11, and the even entries are assigned to ports 1-10. This allocates 10 times the bandwidth to port 11 compared to ports 1 through 10. Therefore, port 11 has a maximum line rate that is 10 times that of ports 1 through 10. Wrapping refers to returning to the head of the table. The Wrap Valid column in Table 1 indicates the end of the entry list, and indexing is then restarted at the beginning of the list.

TABLE 1

| Entries | Wrap Valid | Port number |
| --- | --- | --- |
| 0 | 0 | 1 |
| 1 | 0 | 11 |
| 2 | 0 | 2 |

TABLE 1-continued

| Entries | Wrap Valid | Port number |
|---|---|---|
| 3 | 0 | 11 |
| 4 | 0 | 3 |
| 5 | 0 | 11 |
| 6 | 0 | 4 |
| 7 | 0 | 11 |
| 8 | 0 | 5 |
| 9 | 0 | 11 |
| 10 | 0 | 6 |
| 11 | 0 | 11 |
| 12 | 0 | 7 |
| 13 | 0 | 11 |
| 14 | 0 | 8 |
| 15 | 0 | 11 |
| 16 | 0 | 9 |
| 17 | 0 | 11 |
| 18 | 0 | 10 |
| 19 | 1 | 11 |

In Table 1, each entry of the table represents 5% of the total bandwidth to be allocated for all ports. Port 11 will be selected by the TDM, 107, 10 times as often as any other port. Therefore, port 11 will access the IP pipeline 50% of the time, and ports 1-10 will each access the IP pipeline 5% of the time. The switching rate of the TDM, 107, is controlled by the scheduling logic, 109. The bandwidth of the IP pipeline, 113, may be greater than or equal to the bandwidth required to satisfy the line rate on all ports. In this example, the bandwidth of the IP pipeline, 113, may be greater than or equal to 20G.

Figure 3:
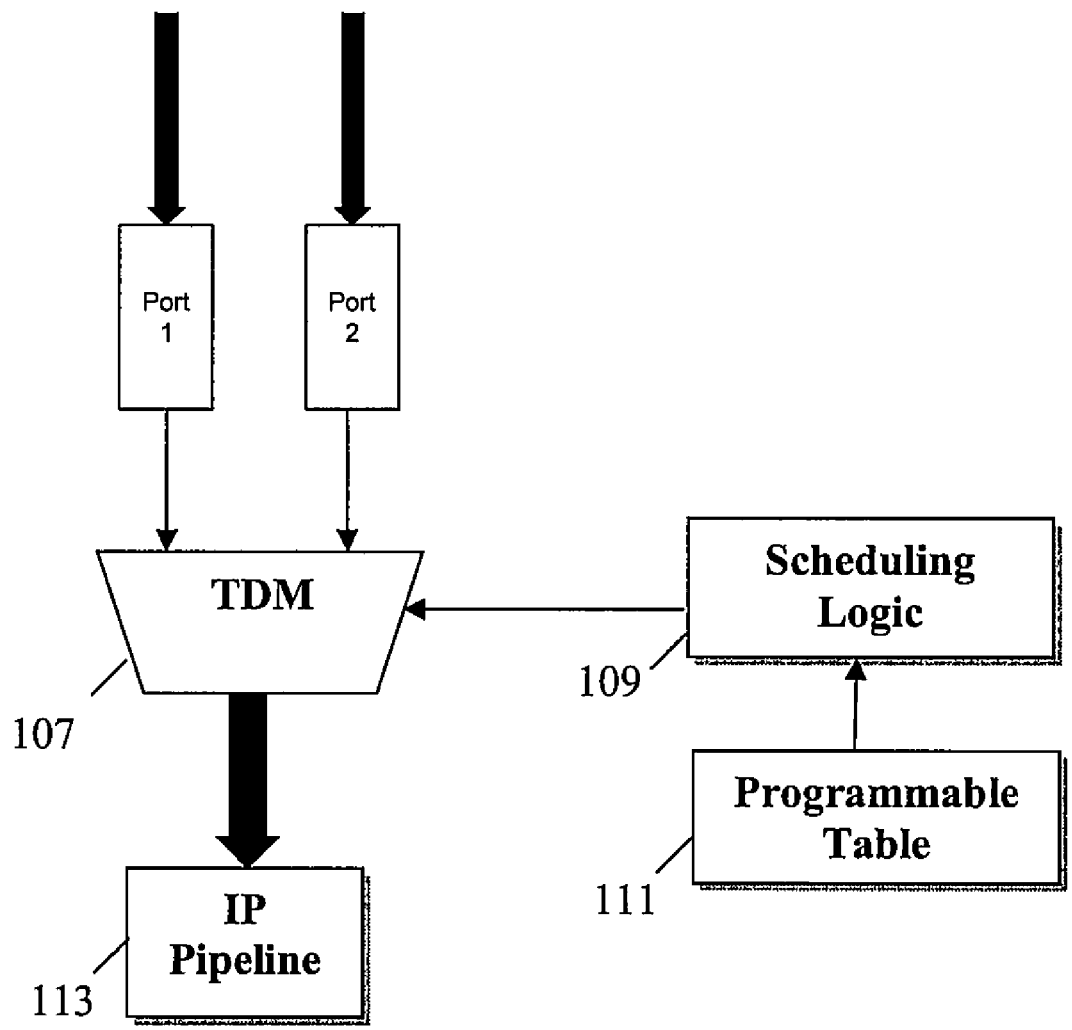
FIG. 3 is a block diagram that illustrates a third exemplary system for TDM arbitration in accordance with a representative embodiment of the present invention.

FIG. 3 illustrates a TDM arbitration example with 2 10G ports. Port traffic is channeled through a Time Division Multiplexer (TDM), 107, that may arbitrate access to downstream components. The TDM, 107, is driven by TDM scheduling logic, 109, in order to arbitrate access by port 1 and port 2 to a common shared resource, e.g. the IP pipeline, 113.

The TDM scheduling logic, 109, may use a programmable table, 111, to select port access. An exemplary TDM table for substantially balanced two port arbitration is shown below as Table 2. Since both ports possess the same bandwidth requirement, Table 2 has two entries, which indicate that the TDM, 107, will toggle between port 1 and port 2.

TABLE 2

| Entries | Wrap valid | Port number |
|---|---|---|
| 0 | 0 | 1 |
| 1 | 1 | 2 |

In Table 2, each entry of the table represents 50% of the total bandwidth to be allocated for all ports. The switching rate of the TDM, 107, is controlled by the scheduling logic, 109. The bandwidth of the IP pipeline, 113, may be greater than or equal to the bandwidth required to satisfy the line rate on all ports. In this example, the bandwidth of the IP pipeline, 113, may be greater than or equal to 20G.

Figure 4:
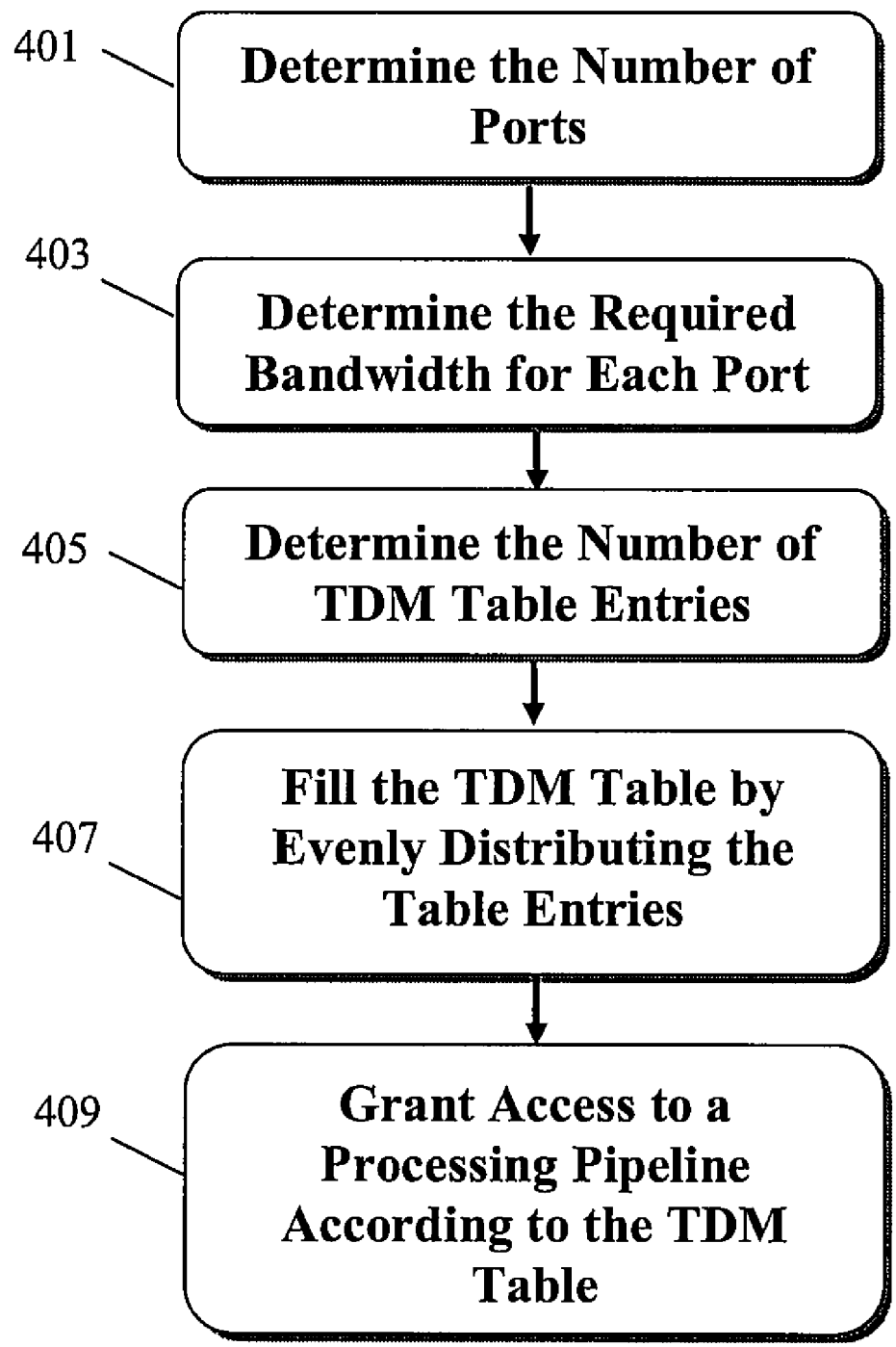
FIG. 4 is a flow diagram that illustrates a method for TDM arbitration in accordance with a representative embodiment of the present invention.

FIG. 4 is a flow diagram that illustrates a method for TDM arbitration in accordance with a representative embodiment of the present invention. At 401, the number of ports is determined. At 403, the required bandwidth for each port is determined. At 405, the number of TDM table entries is determined, and the wrap valid indication is set at the end of the list. For example, the greatest common divisor of the port bandwidths may be selected as the bandwidth that will be allocated as each entry is processed. Therefore, the number of times that a port will be entered may be determined as the port's required bandwidth divided by the greatest common divisor. And the number of TDM table entries would be the sum of the ports' required bandwidth divided by the greatest common divisor. At 407, the TDM table is filled by distributing the table entries corresponding to a particular port as evenly as possible. At 409, the entries of the table are used to define the order in which the ports are serviced and granted access to a processing pipeline.

The present invention may be realized in hardware, software, or a combination of hardware and software. The present invention may be realized in a centralized fashion in an integrated circuit or in a distributed fashion where different elements are spread across several circuits. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A system for allocating bandwidth to a plurality of ports that access a shared resource, wherein the system comprises:
    a multiplexer for receiving the plurality of ports and granting access to the shared resource;
    a table for defining when a port in the plurality of ports accesses the shared resource, wherein each table entry identifies a single port; and
    a circuit for scheduling the multiplexer according to the table, wherein each table entry allows an equal access time to the shared resource.

2. The system of claim 1, wherein access to the shared resource is granted to one port at a time.

3. The system of claim 1, wherein the shared resource is a pipeline.

4. The system of claim 1, wherein the table is programmable.

5. The system of claim 1, wherein the multiplexer, the table, and the scheduling circuit are on a single integrated circuit.

6. The system of claim 1, wherein the table comprises a plurality of entries that are determined according to the number of ports and the bandwidth requirements for each port.

7. The system of claim 6, wherein the entries are changed if the ports change.

8. The system of claim 6, wherein the number of entries is changed if the ports change.

9. The system of claim 1, wherein a first port in the plurality of ports is identified by two or more table entries that are distributed evenly among all the table entries.

10. A method for bandwidth allocation, wherein the method comprises:
performing, with at least one computing device, at least the following:
determining the number of ports that access a shared resource;
determining a required bandwidth for each port that accesses the shared resource;
determining the number of table entries according to the number of ports and the bandwidth requirements for each port, wherein each table entry identifies a single port;
filling a table with the determined number of table entries; and
granting access to the shared resource according to the table, wherein each table entry allows an equal access time to the shared resource.

11. The method of claim 10, wherein the shared resource is a processing pipeline.

12. The method of claim 10, wherein each table entry corresponds to an equal allocation of time.

13. The method of claim 10, wherein each table entry corresponds to a numbered port.

14. The method of claim 10, wherein one table entry specifies the end of the table.

15. The method of claim 10, wherein table entries define the order in which the ports are serviced.

16. The method of claim 10, wherein a first one of the ports is identified by two or more table entries that are distributed evenly among all the table entries.

17. A non-transitory machine-readable storage medium, having stored thereon a computer program having at least one code section for configuring a table, the at least one code section executable by a machine for causing the machine to perform the steps comprising:
determining the number of ports that access a shared resource;
determining a required bandwidth for each port that accesses the shared resource;
determining the number of table entries according to the number of ports and the bandwidth requirements for each port, wherein each table entry identifies a single port;
filling a table with the determined number of table entries; and
granting access to the shared resource according to the table, wherein each table entry allows an equal access time to the shared resource.

18. The non-transitory machine-readable storage medium according to claim 17, wherein the shared resource is a processing pipeline.

19. The non-transitory machine-readable storage medium according to claim 17, wherein each table entry corresponds to an equal allocation of time.

20. The non-transitory machine-readable storage medium according to claim 17, wherein each table entry corresponds to a numbered port.

21. The non-transitory machine-readable storage medium according to claim 17, wherein one table entry specifies the end of the table.

22. The non-transitory machine-readable storage medium according to claim 17, wherein table entries define the order in which the ports are serviced.

23. The non-transitory machine-readable storage medium according to claim 17, wherein the table entries are changed if the ports change.

24. The non-transitory machine-readable storage medium according to claim 17, wherein the number of table entries is changed if the ports change.

25. The non-transitory machine-readable storage medium according to claim 17, wherein the table entries are changed if the bandwidth requirements change.

26. The non-transitory machine-readable storage medium according to claim 17, wherein the number of table entries is changed if the bandwidth requirements change.

27. The non-transitory machine-readable storage medium according to claim 17, wherein the machine and the machine-readable storage are on a single integrated circuit.

28. The non-transitory machine-readable storage medium according to claim 17, wherein a first one of the ports is identified by two or more table entries that are distributed evenly among all the table entries.

* * * * *